United States Patent [19]
Andress

[11] Patent Number: 6,105,569
[45] Date of Patent: Aug. 22, 2000

[54] CAMPFIRE GRILL

[76] Inventor: Eugene E. Andress, Rural Route #3, Port Rowan, Ontario, Canada, N0E 1M0

[21] Appl. No.: 09/335,169
[22] Filed: Jun. 17, 1999
[51] Int. Cl.⁷ .................. A47J 37/00; F24B 3/00
[52] U.S. Cl. ................ 126/30; 126/9 R; 126/25 A
[58] Field of Search .................. 126/29, 30, 9 R, 126/9 B, 25 R, 25 A, 50; 248/156, 161

[56] References Cited

U.S. PATENT DOCUMENTS 2,940,439  6/1960  Bartels et al. ................. 126/30
4,856,423  8/1989  Burns ........................... 126/30
5,117,806  6/1992  Soat ............................ 126/29
5,287,844  2/1994  Fieber .......................... 126/30
5,666,940  9/1997  Kreiter ......................... 126/30

Primary Examiner—James C. Yeung

[57] ABSTRACT

A campfire grill for cooking foods over an open fire. The campfire grill includes a sleeve and an elongate post that slidably extends through the sleeve. The lower end of the post is adapted for insertion in a ground surface. The sleeve has a guide shaft outwardly extending therefrom generally perpendicular the shaft. A grate is slidably coupled to the shaft. The grate is positionable along the shaft. A stopping device prevents downward sliding of the sleeve along the post.

10 Claims, 2 Drawing Sheets

CAMPFIRE GRILL

BACKGROUND OF THE INVENTION

1. Field of the Invention

The present invention relates to grills and more particularly pertains to a new campfire grill for cooking foods over an open fire.

2. Description of the Prior Art

The use of grills is known in the prior art. More specifically, grills heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,666,940; 2,977,953; Des. 344,207; U.S. Pat. Nos. 5,287,844; 4,607,608; and 4,363,313.

While these devices fulfill their respective, particular objectives and requirements, the aforementioned patents do not disclose a new campfire grill. The inventive device includes a sleeve and an elongate post that slidably extends through the sleeve. The lower end of the post is adapted for insertion in a ground surface. The sleeve has a guide shaft outwardly extending therefrom generally perpendicular the shaft. A grate is slidably coupled to the shaft. The grate is positionable along the shaft. A stopping device prevents downward sliding of the sleeve along the post.

In these respects, the campfire grill according to the present invention substantially departs from the conventional concepts and designs of the prior art, and in so doing provides an apparatus primarily developed for the purpose of cooking foods over an open fire.

SUMMARY OF THE INVENTION

In view of the foregoing disadvantages inherent in the known types of grills now present in the prior art, the present invention provides a new campfire grill construction wherein the same can be utilized for cooking foods over an open fire.

The general purpose of the present invention, which will be described subsequently in greater detail, is to provide a new campfire grill apparatus and method which has many of the advantages of the grills mentioned heretofore and many novel features that result in a new campfire grill which is not anticipated, rendered obvious, suggested, or even implied by any of the prior art grills, either alone or in any combination thereof.

To attain this, the present invention generally comprises a sleeve and an elongate post that slidably extends through the sleeve. The lower end of the post is adapted for insertion in a ground surface. The sleeve has a guide shaft outwardly extending therefrom generally perpendicular the shaft. A grate is slidably coupled to the shaft. The grate is positionable along the shaft. A stopping device prevents downward sliding of the sleeve along the post.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new campfire grill apparatus and method which has many of the advantages of the grills mentioned heretofore and many novel features that result in a new campfire grill which is not anticipated, rendered obvious, suggested, or even implied by any of the prior art grills, either alone or in any combination thereof.

It is another object of the present invention to provide a new campfire grill which may be easily and efficiently manufactured and marketed.

It is a further object of the present invention to provide a new campfire grill which is of a durable and reliable construction.

An even further object of the present invention is to provide a new campfire grill which is susceptible of a low cost of manufacture with regard to both materials and labor, and which accordingly is then susceptible of low prices of sale to the consuming public, thereby making such campfire grill economically available to the buying public.

Still yet another object of the present invention is to provide a new campfire grill which provides in the apparatuses and methods of the prior art some of the advantages thereof, while simultaneously overcoming some of the disadvantages normally associated therewith.

Still another object of the present invention is to provide a new campfire grill for cooking foods over an open fire.

Yet another object of the present invention is to provide a new campfire grill which includes a sleeve and an elongate post that slidably extends through the sleeve. The lower end of the post is adapted for insertion in a ground surface. The sleeve has a guide shaft outwardly extending therefrom generally perpendicular the shaft. A grate is slidably coupled to the shaft. The grate is positionable along the shaft. A stopping device prevents downward sliding of the sleeve along the post.

Still yet another object of the present invention is to provide a new campfire grill that provides a distance between the user's hands and the open fire.

Even still another object of the present invention is to provide a new campfire grill that reduces a user's exposure to smoke from a fire.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
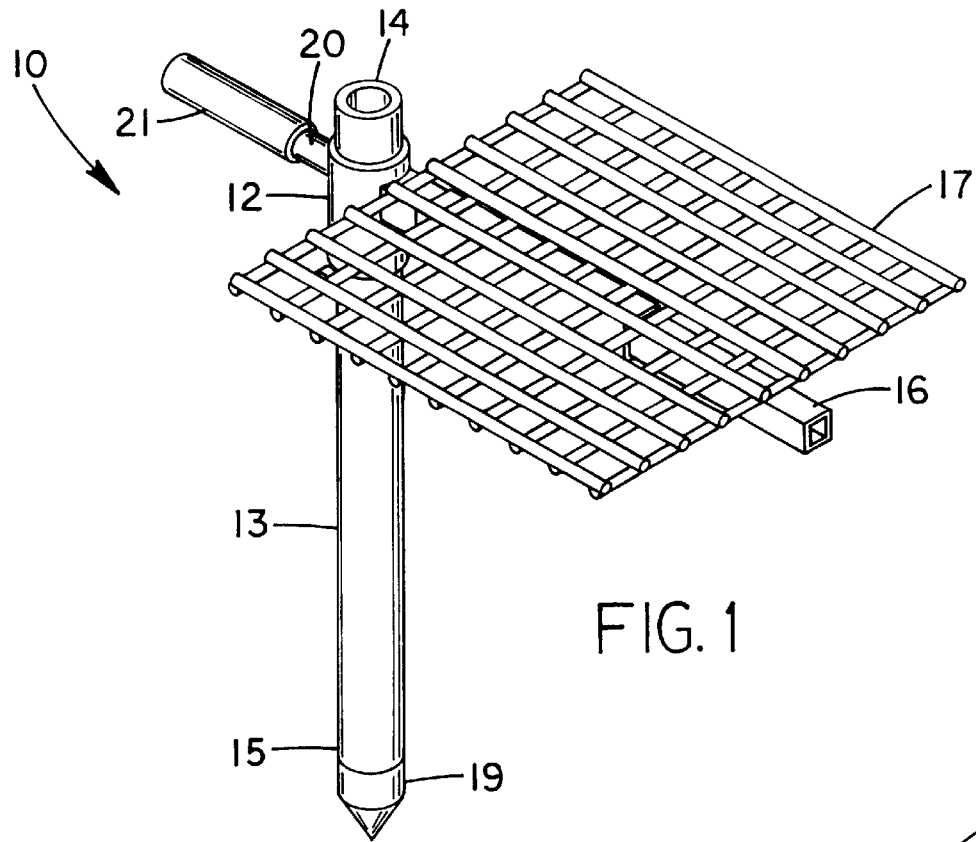
FIG. 1 is a schematic perspective view of a new campfire grill according to the present invention.
Figure 2:
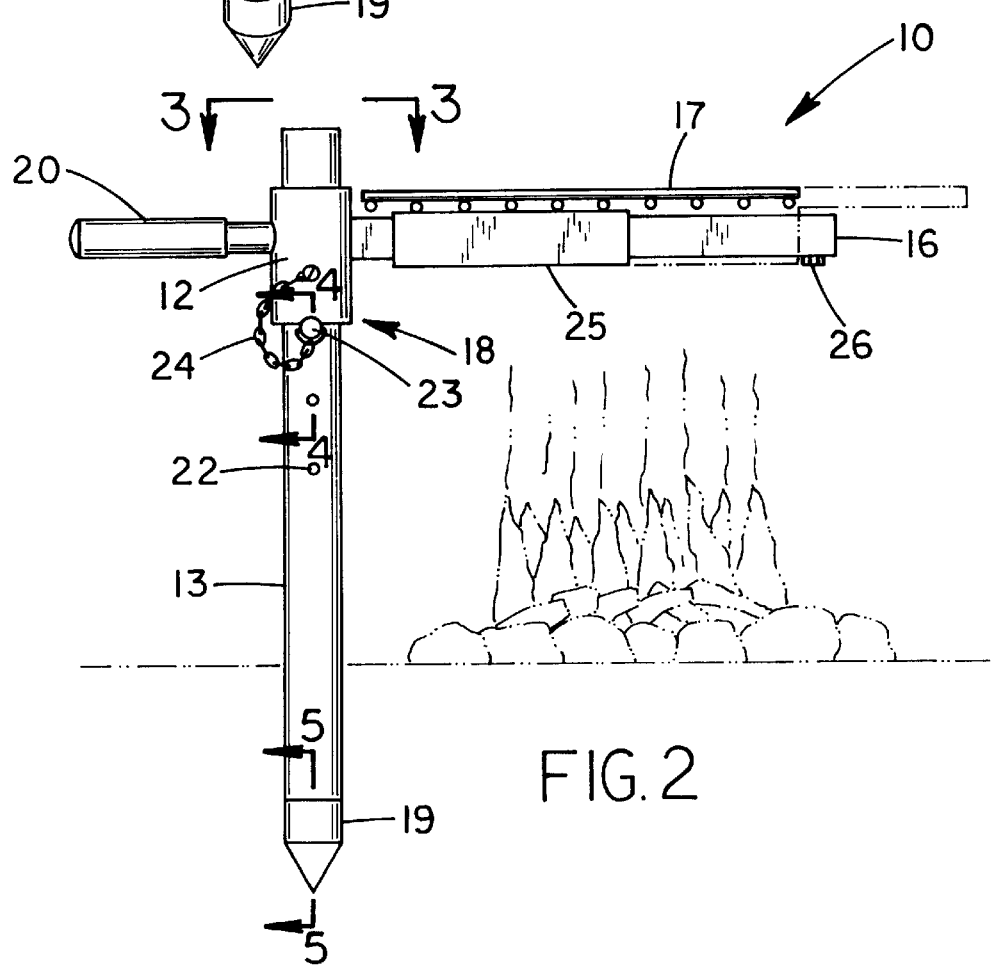
FIG. 2 is a schematic side view of the present invention.
Figure 3:
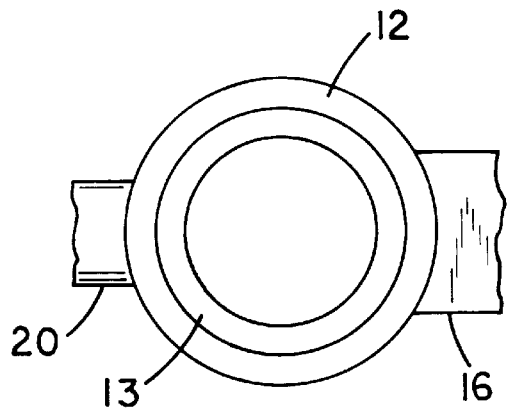
FIG. 3 is a schematic cross sectional view of the present invention taken from line 3—3 of FIG. 2.
Figure 4:
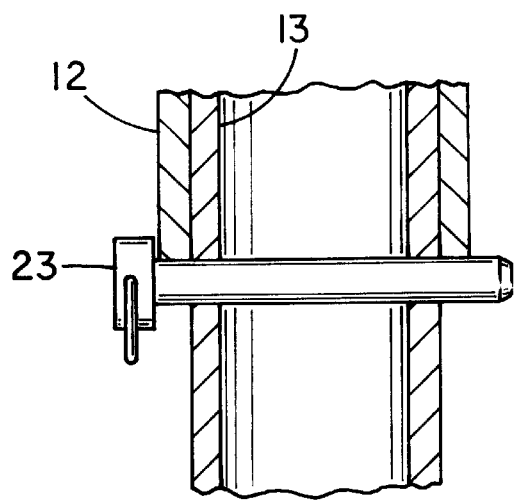
FIG. 4 is a schematic cross sectional view of the present invention taken from line 4—4 of FIG. 2.
Figure 5:
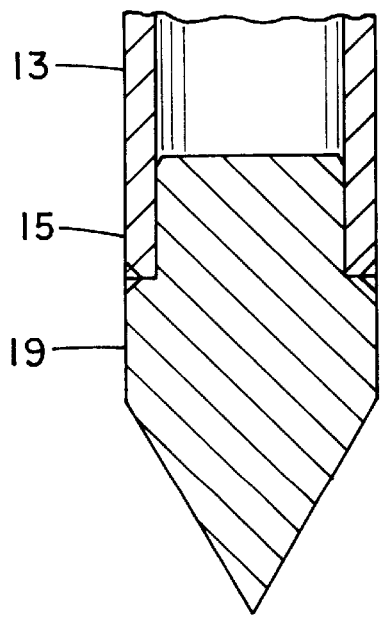
FIG. 5 is a schematic cross sectional view of the present invention taken from line 5—5 of FIG. 2.

With reference now to the drawings, and in particular to FIGS. 1 through 5 thereof, a new campfire grill embodying the principles and concepts of the present invention and generally designated by the reference numeral 10 will be described.

As best illustrated in FIGS. 1 through 5, the campfire grill 10 generally comprises a sleeve 12. An elongate post 13 has upper and lower ends 14,15 and a longitudinal axis extending between the ends. The post slidably extends through the sleeve. The lower end of the post is adapted for insertion in a ground surface. The sleeve has a guide shaft 16 outwardly extending therefrom generally perpendicular the shaft. A grate 17 is slidably coupled to the shaft. The grate is positionable along the shaft. A stopping device 18 prevents downward sliding of the sleeve along the post.

Preferably, the post is cylindrical. Also preferably, the post has a pointed end member 19 coupled to its lower end.

Also preferably, the sleeve has a handle member 20 extending from it generally opposite the guide shaft. Ideally, the handle member has a thermally resistant covering 21 to prevent burning a hand when grasping the handle member.

Preferably, the stopping device permits rotation of the sleeve about the post without loosening or removing the stopping device. This permits swinging of the grate away from directly above the fire so that a user can place and remove food with less risk of injury from hot air rising from the fire as well as with less exposure to smoke rising from the fire.

Also preferably, the post has a plurality of apertures 22 therethrough positioned along its longitudinal axis. The stopping device comprises a pin 23 removably extending through the apertures of the post. The sleeve rests on the pin to permit rotatation of the sleeve about the post. Ideally, a chain 24 extends between the pin and the sleeve so that the pin doesn't become lost.

Ideally, the guide shaft has a generally rectangular transverse cross section. The grate has a generally rectangular guide sleeve 25 extending around the guide shaft. The rectangular shapes are required to prevent tipping of the grate. The guide shaft should have a stop member 26 that prevents the guide sleeve from sliding off of the guide shaft.

The preferred length of the post along its longitudinal axis is about 36 inches. This height is preferred to permit sufficient insertion in the ground while permitting the grate to be positioned high enough over the fire to merely warm food. The preferred dimensions of the grate is about 16 by 16 inches.

In use, the lower end of the post is driven into the ground adjacent a fire. The sleeve is inserted over the upper end of the post. The pin is inserted through the apertures of the post to hold the sleeve, and thereby the grate, at the desired distance above the fire. Food is placed on the grate and the handle is used to rotate the sleeve to position the grate above the fire.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A grill, comprising:

a sleeve;

an elongate post having upper and lower ends and a longitudinal axis extending between said ends, said post slidably extending through said sleeve, said lower end of said post being adapted for insertion in a ground surface;

said sleeve having a guide shaft outwardly extending therefrom generally perpendicular said shaft;

a grate and a slider member fixedly coupled to said grate, said slider member having a channel therethrough with said guide shaft being received in said channel such that said slider member is slidably coupled to said guide shaft, said grate being slidably positionable along said guide shaft at various distances from said post; and a stopping device for preventing downward sliding of said sleeve along said post, wherein said stopping device permits free rotation of said sleeve about said post.

2. The grill of claim 1, wherein said post has a pointed end member coupled thereto.

3. The grill of claim 1, wherein said sleeve has a handle member extending therefrom generally opposite said guide shaft.

4. The grill of claim 3, wherein said handle member has a thermally resistant covering.

5. The grill of claim 1, wherein said post has a plurality of apertures therethrough positioned along said longitudinal axis thereof, said stopping device comprising a pin removably extending through said apertures of said post.

6. The grill of claim 5, wherein said sleeve has a substantially smooth lower edge resting on said pin of said stopping device to permit easy rotation of said sleeve about said post.

7. The grill of claim 1, wherein said guide shaft has a generally rectangular transverse cross section, said grate having a generally rectangular guide sleeve extending around said guide shaft.

8. The grill of claim 1, further comprising a chain being coupled between said stopping device and said sleeve such that said chain can restrict the degree of rotation of said sleeve in respect to said elongate post.

9. The grill of claim 1, wherein said guide shaft has a stop member located at a free end thereof for preventing the slider member from sliding off of the guide shaft.

10. A grill, comprising:

a sleeve;

an elongate post having upper and lower ends and a longitudinal axis extending between said ends, said post slidably extending through said sleeve, said lower end of said post being adapted for insertion in a ground surface;

said sleeve having a guide shaft outwardly extending therefrom generally perpendicular said shaft;

a grate slidably coupled to said shaft, said grate being positionable along said shaft;

a stopping device for preventing downward sliding of said sleeve along said post;

wherein said post has a pointed end member coupled thereto;

said sleeve having a handle member extending therefrom generally opposite said guide shaft;

wherein said handle member has a thermally resistant covering;

wherein said stopping device permits rotation of said sleeve about said post;

said post having a plurality of apertures therethrough positioned along said longitudinal axis thereof, said stopping device comprising a pin removably extending through said apertures of said post; and said guide shaft having a generally rectangular transverse cross section, said grate having a generally rectangular guide sleeve extending around said guide shaft.

* * * * *